United States Patent
Devlin et al.

[15] 3,652,835
[45] Mar. 28, 1972

[54] AIRCRAFT GLIDE SLOPE COUPLER SYSTEM

[72] Inventors: Bernard T. Devlin; William F. Poland, both of Phoenix, Ariz.

[73] Assignee: Sperry Rand Corporation

[22] Filed: May 14, 1970

[21] Appl. No.: 37,073

[52] U.S. Cl. ............235/150.22, 244/77 A, 343/108 R
[51] Int. Cl. ..................................G06g 7/78, G01s 1/18
[58] Field of Search..................35/10.2; 235/150.22, 183; 340/27 AT, 27 NA; 343/107, 108 R, 108 M, 112 C, 112 A; 244/77 A, 77 B, 77 C

[56] References Cited

UNITED STATES PATENTS

| | | | |
|---|---|---|---|
| 3,295,796 | 1/1967 | Gaylor | 244/77 |
| 3,280,310 | 10/1966 | Montooth | 235/150.22 |
| 3,333,795 | 8/1967 | Hattendorf et al. | 244/77 |
| 3,059,881 | 10/1962 | Letson | 244/77 |
| 3,266,753 | 8/1966 | Gaylor | 343/108 X |
| 3,355,733 | 11/1967 | Mitchell et al. | 235/150.22 X |
| 3,361,391 | 1/1968 | Medlinski | 343/107 X |
| 3,447,765 | 6/1969 | Doniger et al. | 244/77 |
| 3,489,378 | 1/1970 | Watson et al. | 343/108 X |
| 3,523,664 | 8/1970 | Doniger et al. | 343/108 X |

Primary Examiner—Malcolm A. Morrison
Assistant Examiner—Jerry Smith
Attorney—S. C. Yeaton

[57] ABSTRACT

A glide slope coupler adaptable to both Autopilot and Flight Director modes for guiding an aircraft to a landing along a radio defined glide slope beam. An integrator common to both modes effectively memorizes the aircraft descent rate and provides a signal representative thereof for summation with glide slope beam displacement and altitude rate signals in respective amplifiers coupled to drive the pitch actuators and Flight Director Indicator bar. A synchronizing mode is included for coupling the pitch actuator driver amplifier output to the integrator input to obtain a desired descent rate signal while flying in a cruise mode prior to intercepting the glide slope beam. Upon intercepting the beam either the Autopilot or Flight Director mode is activated as chosen by the pilot and the selected system then operates to reduce the beam displacement signal to zero with flight path damping being provided by the altitude rate signal. During the descent the beam displacement signal is modified as a function of altitude to compensate for the convergence of the glide slope beam. At a predetermined flare altitude the beam displacement signal is rendered ineffective and thereafter the integrator output signal is modified as a function of altitude to control the flare in accordance with the memorized value of the descent rate at the commencement of the flare maneuver.

14 Claims, 2 Drawing Figures

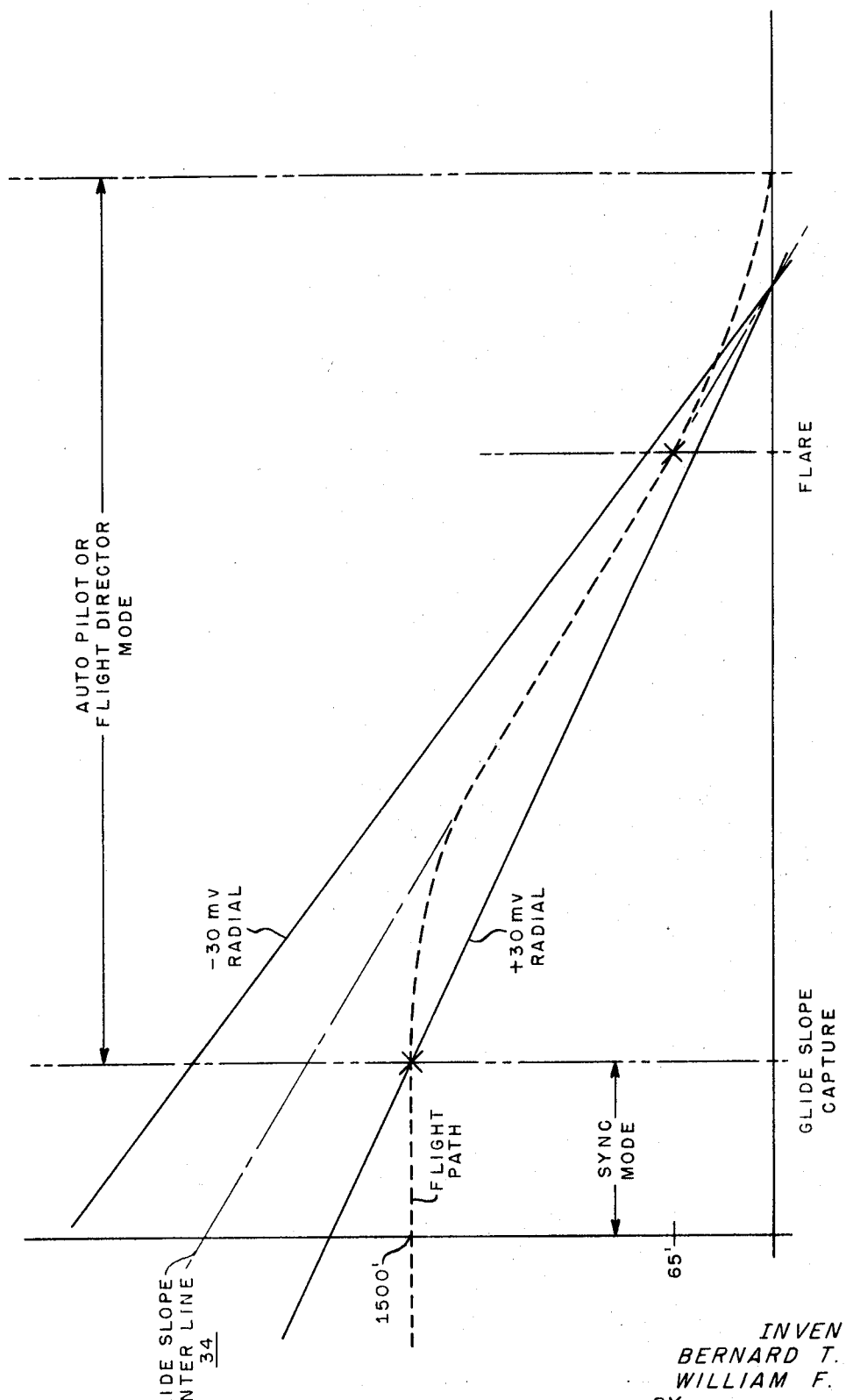

AIRCRAFT GLIDE SLOPE COUPLER SYSTEM

BACKGROUND OF THE INVENTION

1. Field of the Invention

The present invention relates to apparatus for guiding an aircraft to a landing along a radio defined glide slope beam and more particularly to glide slope coupler apparatus adaptable for operation in both Autopilot and Flight Director modes for guiding a craft during the course of the beam capture, descent and flare phases of the landing procedure.

2. Description of the Prior Art

Prior art devices relating to glide slope coupler systems are exemplified by U.S. Pat. No. 3,058,699, issued Oct. 16, 1962, in the name of S. S. Osder; U.S. Pat. No. 3,059,881, issued Oct. 23, 1962, in the name of R. A. Letson; U.S. Pat. No. 3,052,427, issued Sept. 4, 1962, in the name of M. J. Match et al. and U.S. Pat. No. 3,115,319, issued Dec. 24, 1963, in the name of M. B. Glaser et al.; all of which are assigned to the assignee of the present invention. The Osder and Letson patents relate to apparatus for capturing the glide slope beam while the Match and Glaser patents are concerned with apparatus for flaring out of the beam to effect a desired touchdown.

In both Osder and Letson the primary control for capturing or flaring into the beam is provided by an altitude rate error signal derived from a comparison of signals representative of a desired rate of descent and the actual measured rate of descent. More specifically, Osder effects the beam capture by determining when the craft has intercepted the center line of the glide slope beam and then switching in the glide slope receiver so that pitch control is provided by a signal indicative of craft displacement from the beam, the integral of the displacement signal and the altitude rate error signal plus attitude and damping terms. As mentioned above, the altitude rate error signal provides the predominant pitch control during the capture phase for the purpose of rapidly reducing the overshoot which occurs as a consequence of delaying the start of the pitch maneuver until the center of the glide slope beam has been intercepted. After a brief interval, however, on the order of 10 seconds, the altitude rate error signal is switched out of the pitch control loop and the descent proceeds under the primary control of the beam displacement and integral of beam displacement signals. This system has a comparatively large inherent overshoot attendant to its mode of operation.

Letson employs the same pitch control signals as Osder but reduces the overshoot by switching in the altitude rate error signal for a predetermined time to control the pitch loop prior to intercepting the center of the beam and thereafter utilizing the beam displacement and integral signals for controlling the descent of the craft along the glide slope beam. It will be apparent to those skilled in the art that even for a standard altitude hold capture, that is a capture maneuver initiated at a time when the craft is in level flight, a beam standoff is likely to exist at the end of the altitude rate error control period.

In the present invention the above mentioned limitations of the prior art systems are overcome by continuously employing the beam displacement signal in conjunction with memorized rate of descent and actual rate of descent signals from the commencement of the capture maneuver. Moreover, once the Autopilot or Flight Director glide slope coupler of the present invention is actuated the necessity for further switching of various signals is obviated thereby enhancing the reliability of the system.

Regarding the prior art flare out systems, Match et al., for example, employs the glide slope beam displacement signal to control the Flight Director Indicator bar during the descent until a predetermined transition altitude is reached at which time it is rendered ineffective. During the descent down to the transition altitude the actual altitude rate is memorized and after the transition point the memorized signal is compared with a signal indicative of the actual measured rate of descent to provide a control signal for the Flight Director bar. This technique is used because of the likelihood of the glide slope receiver signal containing spurious information at altitudes below the transition altitude. At a subsequent lower altitude the flare maneuver is initiated by introducing a constant term into the rate of descent control signal so as to cause the craft to pitch up slightly and thus flare out for landing. Operation in this manner, however, can produce undesirably hard landings, or alternatively can preclude a touchdown. For instance, if the nominal desired touchdown descent rate is 2 feet per second corresponding to a descent rate prior to flare of say 11 feet per second, then the flare command, that is the constant added to the descent rate signals, must produce a 9 foot per second change in the descent rate. If for some reason, perhaps a strong tailwind, the actual descent rate is greater than the nominal value of 11 feet per second such that it has a value for example of 14 feet per second, the 9 feet per second reduction will provide a 5 feet per second touchdown descent rate, which is unsuitable. On the other hand, if the actual descent rate is only 8 feet per second at the inception of flare, the 9 feet per second reduction will result in an ascent rate of 1 foot per second and thus prevent the craft from landing.

In the present invention a closed-loop flare control is used as opposed to the open-loop flare controls of the prior art to prevent the occurrence of the above-described conditions. Further as in the case of the prior art beam capture systems, it is seen that considerable signal switching is required in the Match et al. apparatus and this is true also for the aforementioned Glaser apparatus. The present invention, on the other hand, accomplishes the flare maneuver without signal switching and thus provides a completely switchless device during the capture, descent and flare phases of operation. As will be explained subsequently, the only switching attendant to the apparatus of the present invention occurs in a synchronizing mode upon initiation of the capture phase for placing the system in Autopilot or Flare Director control. Moreover, because of the integrator technique employed in the present invention the necessity for a transition altitude reference is obviated. This will be understood more fully after reading the subsequent Description of the Preferred Embodiment.

SUMMARY OF THE INVENTION

A preferred glide slope coupler constructed in accordance with the principles of the present invention incorporates altitude rate damping in apparatus adaptable for use in both Autopilot and Flight Director modes to provide a high performance system with minimum complexity, maximum commonality of parts, and compatibility of flight control laws. The coupler includes a synchronizing mode which is actuated during cruise flight prior to intercepting the glide slope beam. In the synchronizing mode the output of the pitch actuator driver amplifier is coupled back to the input of an integrator which provides an output signal for summing with the glide slope beam displacement signal and an altitude rate signal in the driver amplifier. Thus, for a level flight condition, in other words a standard altitude hold capture or zero altitude rate, the beam displacement signal is balanced against the integrator output in a manner to provide a signal thereat representative of a nominal desired descent rate. The integrator is also used in both the Autopilot and Flight Director modes to provide a controllable desired descent rate signal determined in accordance with the actual descent rate. In the Autopilot mode this is accomplished by connecting the integrator to receive the beam displacement signal from the glide slope receiver while in the Flight Director mode it is accomplished by switching the integrator output into its input along with the altitude rate signal.

More specifically, in Flight Director operation an amplifier connected to drive the Flight Director Indicator bar has coupled to its input a signal derived from the output of the integrator together with the beam displacement and altitude rate signals. Now, as a result of the previous synchronizing operation, the integrator output signal corresponds to the glide slope descent rate. When the craft intercepts a predetermined radial of the beam, it is switched into the Flight Director mode, as previously selected by the pilot, resulting in the aforementioned signal input to the integrator, namely altitude rate and integrator output, whereupon a signal is provided at the integrator output to wash out the altitude rate signal coupled to the input of the Flight Director amplifier. Hence, the glide slope beam displacement signal is the predominate control for the indicator bar with the altitude rate signal providing path damping. The system therefore operates during the descent to reduce the beam displacement to zero with the integrator output signal washing out the steady state descent rate signal.

In the Autopilot mode the actuator driver amplifier is coupled to receive a signal derived from the integrator along with the glide slope beam displacement and altitude rate signals. As in the case of the Flight Director, the previous synchronizing operation has driven the integrator output signal to a level corresponding to the glide slope descent rate and then as the craft intercepts the beam the coupler is switched into the Autopilot mode in accordance with the pilot's selection. In the Autopilot mode the glide slope beam displacement signal is switched onto the integrator input and the system operates to integrate the beam displacement to zero so that the system is satisfied when the beam displacement is zero and the beam integrator cancels the descent rate. Thus for both Autopilot and Flight Director operation the integrator effectively memorizes the descent rate.

Moreover, in both the Autopilot and Flight Director modes the glide slope displacement signal is continuously modified as a function of altitude, starting at a prescribed altitude, to compensate for the convergence of the glide slope beam as the craft approaches the ground. Likewise, in both modes a flare command is initiated at a predetermined altitude whereupon the glide slope displacement signal is rendered ineffective and the integrator output is continuously modified thereafter as a function of altitude to achieve a flare which is determined by the instantaneous descent rate at the beginning of the flare maneuver to assure touchdown within tolerable limits of a nominal touchdown descent rate.

BRIEF DESCRIPTION OF THE DRAWINGS

FIG. 2 is a diagram of a typical glide path depicting the points at which the capture and flare maneuvers are initiated.

DESCRIPTION OF THE PREFERRED EMBODIMENT

Figure 1:
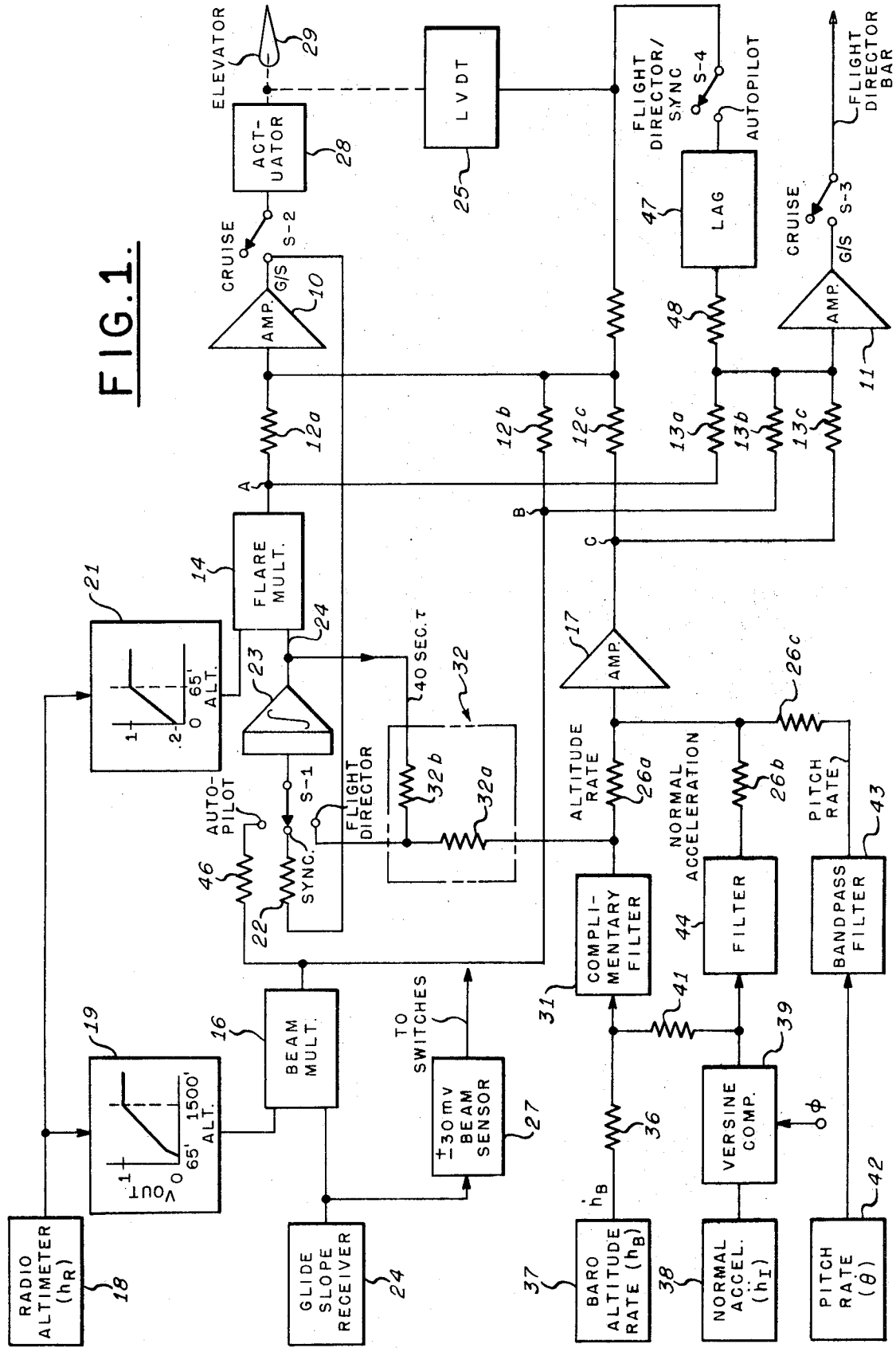
FIG. 1 is a block diagram showing the general arrangement of components in a preferred embodiment of the invention.

Referring to the figures, the glide slope coupler apparatus of the present invention comprises an autopilot actuator driver amplifier 10 and a flight director indicator driver amplifier 11 connected through respective resistors 12a, b and c and 13a, b and c to points A, B and C which in turn are connected respectively to the outputs of flare multiplier 14, beam multiplier 16 and amplifier 17 to receive appropriate operational control signals as will be described in the ensuing paragraphs. During normal cruise flight switches S-2 and S-3 are in the CRUISE position so that the coupler is inoperative.

Consider the operation of the coupler prior to intercepting the glide slope beam, momentarily disregarding the function of the radio altimeter 18 and programmable limiters 19 and 21. At this time the coupler operates in a synchronizing mode as indicated by switch S-1 being engaged with the SYNC contact. In this mode the output of the actuator driver amplifier 10 is connected through resistor 22 and switch S-1 to the input of integrator 23 which has its output connected by lead 24 to the input of the flare multiplier. At the synchronizing altitude, typically about 1,500 feet or more, programmable limiter 21 multiplies the integrator output by unity so that the integrator is effectively coupled directly to point A. Likewise, at the synchronizing altitude programmable limiter 19 multiplies the beam displacement signal provided at the output of glide slope receiver 24 by a factor of unity so that the receiver output is effectively coupled directly to point B. In addition, as indicated in the drawing, amplifier 17 has connected to its input through resistors 26a, b and c respective altitude rate, normal acceleration and pitch rate signals. For a standard altitude hold glide slope capture, that is with the aircraft cruising in level flight during the synchronizing mode, all of these signals in addition to the feedback signal from the linear variable differential transformer 25 will be substantially equal to zero thus providing a signal level of zero at point C. Hence, with the aircraft in level flight the two input signals to actuator driver amplifier 10 are the integrator/flare multiplier output provided at point A and the glide slope beam displacement signal provided at point B. Actually the glide slope beam is considerably wider, about ±200 millivolts, than the ±30 millivolt width depicted in FIG. 2. During the time the craft is flying from the +200 millivolt beam fringe to the +30 millivolt radial the coupler is synchronizing with the integrator output continuously changing to nullify the varying beam displacement signal, the coupler system gains being adjusted such that for a given craft velocity the +30-millivolt beam displacement signal balanced against the integrator/flare multiplier output signal corresponds to a desired descent rate along the glide slope beam, say 11 feet per second. At the +30 millivolt radial the beam sensor 27 provides an output signal to actuate switches S-2 and S-3 to the GLIDE SLOPE position thereby enabling amplifier 10 to control actuator 28 which drives elevator 29 and likewise enabling amplifier 11 to drive the Flight Director Indicator bar. At the same instant switch S-1 is actuated to either the AUTOPILOT or FLIGHT DIRECTOR position in accordance with a prior selection made by the pilot. It should be understood that the above reference to a standard altitude capture is not to be construed as signifying that the coupler can operate only under such conditions. Those skilled in the art will recognize that the system will operate to achieve the desired result even under different dynamic conditions prevailing during the synchronizing mode. The standard altitude hold capture is alluded to simply for ease of description and understanding.

First consider the Flight Director mode. On actuation of Switch S-1 to the FLIGHT DIRECTOR position the integrator output signal and the altitude rate signal provided at the output of complimentary filter 31 are coupled through summing network 32, comprising resistors 32a and b, into the input of the integrator. The complimentary filter provides a transfer function of $1/11s+1$ relative to the altitude rate signal ($\dot{h}_B$) which it derives through resistor 36 from a barometric altitude rate sensor 37 of the type described in Osder and Letson (Item 41). Further it provides a transfer function of $11/11s+1$ relative to the normal acceleration signal $h_I$ derived from normal accelerometer 38 through versine computer 39 and resistor 41. The output signal of the complimentary filter resulting from the sum of these transfer functions is $$\frac{\dot{h}}{11s+1} + \frac{11\ddot{h}}{11s+1} = \frac{\dot{h}}{11s+1}$$

$$+\frac{11s\dot{h}}{11s+1} = \frac{\dot{h}(11s+1)}{11s+1} \text{ or simply } \dot{h}$$

(altitude rate). By summing the altitude rate and normal acceleration signals in this manner the instantaneous altitude rate signal produced at the output of the complimentary filter is a function of barometric rate at low frequencies and inertial rate at high frequencies. As indicated in the drawing, the versine computer is controlled in accordance with the craft roll angle ($\phi$) to compensate for the reduced effect of the earth's gravity on the normal accelerometer as the aircraft rolls from a level condition. This feature is not required, of course, when the normal acceleration signal is obtained from a stable platform. Short period mode damping during glide slope and flare control, and tight control to the beam for wind gusts or wind sheer, are provided by filtered pitch rate ($\theta$) and normal acceleration signals derived respectively from pitch rate sensor 42 through bandpass filter 43 and from the normal accelerometer/versine computer output through filter 44.

Initially as the craft moves from point of interception with the 30 millivolt beam radial toward the beam center line 34, the beam displacement signal decreases thereby lowering the voltage at point B. This reduction of a fly-up command constitutes a fly-down command causing the aircraft to pitch down for the purpose of getting onto the center line of the glide slope beam. At this time the altitude rate signal becomes effective with the ultimate result that the integrator produces a signal at point A which washes out the altitude rate signal at point C. In other words, as the craft pitches down and approaches the beam center line the altitude rate signal increases while simultaneously the beam displacement signal decreases until finally when the craft is on the glide slope center line the beam displacement signal is zero and the altitude rate signal at point C is balanced against the integrator/flare multiplier output signal at point A. Thereafter, assuming a fairly steady descent rate, the Flight Director bar is controlled by the beam displacement signal with the washed out altitude rate signal providing flight path damping. The capture maneuver is thus performed under the continuous control of the beam displacement signal aided by the actual and desired altitude rate signals with a resulting asymptotic capture of the beam center line as indicated by the dashed line flight path in FIG. 2. Operation in the foregoing manner is obtained by selecting resistor 32b to provide long time constant integrator feedback, on the order of 40 seconds. This effectively converts the integrator to a lag network with respect to the altitude rate signal applied thereto through resistor 32a. Hence, the integrator output signal is able to change from the nominal descent rate value acquired during the standard altitude hold capture but any change which does occur is small because of the operation of the integrator-lag network. In the meantime, any change of the actual descent rate immediately produces a signal at point C to provide the flight path damping. The net result of this action is that the integrator output signal varies to wash out the actual measured descent rate, whatever it may be, so that the beam displacement signal can effectively control the Flight Director Indicator bar during the glide slope descent and thereby enable a beam standoff to be avoided.

When the capture maneuver commences, preferably at the prescribed 1,500 foot altitude, limiter 19 operates to modify the beam displacement signal as a function of altitude in response to a signal derived from radio altimeter 18 so as to compensate for the convergence of the glide slope beam, that is the signal strength per foot of displacement from the center line of the beam, as the craft approaches the landing strip. This can be accomplished simply by varying the limiter voltage output ($V_0$) from unity down to zero in accordance with altitude as indicated in the drawing. Any conventional circuit capable of performing the indicated function can be used. In this way the beam displacement signal will be multiplied by successively smaller numbers as the craft altitude decreases. Finally, at the flare point, 65-feet altitude for example, the beam multiplier output reduces to zero as a consequence of the beam displacement signal being multiplied by zero voltage output from limiter 19. At the same instant the voltage output of limiter 21 is reduced from unity down to 0.2 as a function of altitude, in response to the radio altimeter signal, causing the signal at point A to decrease. This constitutes a fly-up command causing the craft to flare out prior to touchdown. Thus, the desired glide slope descent rate of 11 feet per second will produce a touchdown descent rate of 2.2 feet per second. If the descent rate increases to 14 feet per second as discussed with reference to the prior art systems, the touchdown descent rate will increase to only 2.8 feet per second; and, likewise, if the descent rate at the beginning of the flare is 8 feet per second, touchdown will still be assured with a touchdown descent rate of 1.6 feet per second. The flare control of the present invention thus provides suitable touchdown descent rates independent of variations of the actual craft descent rate within given limits from the desired descent rate and further assures a restricted longitudinal touchdown point distribution.

Operation in the Autopilot mode is essentially the same as described with reference to the Flight Director mode except for certain differences which will now be discussed. In the Autopilot mode, upon intercepting the 30 millivolt radial of the glide slope beam subsequent to synchronizing, the beam sensor 27 actuates switch S-1 to the AUTOPILOT position connecting the output of beam multiplier 16 through resistor 46 to the integrator input. Then as the craft flys toward the center of the beam, reducing the beam displacement signal, the resultant fly-down command (beam displacement signal less than the signal at point A) causes the craft to pitch down whereupon an altitude rate signal is provided at point C. The beam displacement integrator gain is made sufficiently low so that the integrator output signal remains essentially at its initial value during the entire capture phase. Accordingly, the coupler operates to reduce the beam displacement signal to zero with the altitude rate signal at point C being cancelled by the integrator/flare multiplier output signal at point A. The low gain of the integrator enables the altitude rate signal to provide flight path damping for changes which may occur in the descent rate. In all other respects, including the operation of the limiters and the damping terms, the operation of the Glide Slope Coupler is the same in both Autopilot and Flight Director modes.

It is thus seen that the integrator which is considered an essential component of the coupler for Autopilot operation is also employed for Flight Director operation. In both instances the integrator effectively memorizes a signal representative of the desired descent rate and thereby enables similar operation of the coupler in both modes, namely beam displacement control aided by altitude rate flight path damping in conjunction with short-term normal acceleration and pitch rate damping. In addition, the integrator is utilized during the preliminary synchronizing mode to achieve continuous beam displacement control from the inception of the capture phase.

In a case where it is desired to use the Flight Director Indicator as a monitor of Autopilot performance, the actuator feedback signal derived from the linear variable differential transformer is coupled through switch S-4, lag network 47 and resistor 48 into Flight Director amplifier 11. This removes the Autopilot trim signal from the Flight Director Indicator.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. Apparatus for guiding a craft to a landing along a radio defined glide slope beam, comprising
    an integrator for storing a signal representative of a desired descent rate along the glide slope beam,
    means for providing a signal representative of the craft displacement from the center line of the glide slope beam,
    means for providing a signal representative of the actual descent rate of the craft,
    means for algebraically summing the stored signal of said integrator with the actual descent rate and beam displacement signals, and
    means for selectively coupling the output of said summing means to the input of said integrator prior to the craft intercepting a predetermined radial of the glide slope beam for controlling the output signal level of the integrator in accordance with the instantaneous amplitude of the beam displacement and actual descent rate signals whereby upon the craft intercepting said predetermined radial at a given velocity in a level flight condition a desired descent rate signal is produced at the output of said integrator to cause pitch down of the craft for capturing the glide slope beam.

2. The apparatus of claim 1 wherein the selective coupling means is further operative upon disconnecting the output of said summing means from the input of said integrator for applying either the displacement signal or the combination of the actual descent rate signal and the integrator output signal to the integrator input for varying the desired descent rate signal so as to wash out the steady state actual descent rate signal whereby the output signal of said summing means is indicative of the craft displacement from the center line of the glide slope beam.

3. The apparatus of claim 2 including means for reducing the magnitude of the beam displacement signal in proportion to decreasing craft altitude below a predetermined altitude to compensate for convergence of the glide slope beam approaching ground level.

4. The apparatus of claim 3 further including means for deactivating the beam displacement signal at a second lower predetermined altitude and simultaneously continuously modifying the desired descent rate signal as a function of altitude from said second predetermined altitude to touchdown such that the touchdown descent rate is a prescribed fraction of the instantaneous descent rate prevailing at a predetermined altitude.

5. The apparatus of claim 1 wherein the selective coupling means is further operative upon disconnecting the output of said summing means from the input of said integrator for connecting the integrator output to its input and simultaneously applying the actual descent rate signal thereto so that the integrator output signal is driven to a level equal to that of the steady state actual descent rate signal whereby the displacement signal provides the predominant control for guiding the craft down the glide slope beam.

6. The apparatus of claim 5 wherein the output of said integrator is connected to its input through an impedance of sufficient value to convert the integrator to a long time constant lag network.

7. The apparatus of claim 5 further including means for deactivating the beam displacement signal at a second lower predetermined altitude and simultaneously continuously modifying the desired descent rate signal as a function of altitude from said second predetermined altitude to touchdown such that the touchdown descent rate is a prescribed fraction of the instantaneous descent rate prevailing at the predetermined altitude.

8. The apparatus of claim 1 wherein the selective coupling means is operative upon disconnecting the output of said summing means from the input of said integrator for connecting the displacement signal means to the integrator input so that the integrator output is driven to a level equal to that of the steady state actual descent rate signal whereby the displacement signal provides the predominant control for guiding the craft along the center line of the glide slope beam.

9. The apparatus of claim 8 further including means for deactivating the beam displacement signal at a second lower predetermined altitude and simultaneously continuously modifying the desired descent rate signal as a function of altitude from said second predetermined altitude to touchdown such that the touchdown descent rate is a prescribed fraction of the instantaneous descent rate prevailing at the predetermined altitude.

10. An integrated Autopilot/Flight Director glide slope coupler system for guiding a craft to a landing along a radio defined glide slope beam, comprising means for providing a signal representative of the craft displacement from the center line of the beam, switching means enabling said system to be set initially in a synchronizing mode and thereafter in either an Autopilot or Flight Director mode, means for providing a signal representative of the actual descent rate of the craft, an integrator for storing a signal representative of a desired descent rate, means for algebraically summing the integrator output signal with the displacement and actual altitude rate signals, and said switching means being operative in a first condition corresponding to the synchronizing mode, prior to the craft intercepting a predetermined radial of the glide slope beam, to connect the output of said summing means to the input of said integrator for controlling the output signal level thereof in accordance with the instantaneous amplitude of the beam displacement and actual descent rate signals whereby upon the craft intercepting said predetermined radial in a level flight condition at a prescribed velocity the signal at the output of said integrator is representative of a desired descent rate to cause a craft pitch down to fly along the center line of the glide slope beam.

11. The apparatus of claim 10 further including additional algebraic summing means connected to receive the actual descent rate, displacement and desired descent rate signals to produce a resultant flight director indicator control signal, and means for summing the actual descent rate and desired descent rate signals and applying them to the input of said integrator during a second condition of said switching means corresponding to the flight director mode so that the steady state effect of the actual rate of descent signal is effectively nullified in said additional summing means.

12. The apparatus of claim 11 further including means for continuously modifying the displacement signal in accordance with the instantaneous altitude of the craft from a first predetermined altitude down to a second predetermined altitude to compensate for convergence of the glide slope beam, and means for continuously modifying the output signal of said integrator in accordance with the instantaneous craft altitude from the second predetermined altitude to touchdown such that the touchdown descent rate is a prescribed fraction of the instantaneous descent rate prevailing at the second predetermined altitude.

13. The apparatus of claim 10 wherein the switching means is operative upon completion of the synchronizing mode to disconnect the output of the algebraic summing means from the integrator input and to connect thereto the output of said beam displacement means in a third condition of said switching means corresponding to the autopilot mode such that the effect of the steady state actual rate of descent signal is effectively nullified in said algebraic summing means.

14. The apparatus of claim 13 including means for continuously modifying the displacement signal in accordance with the instantaneous altitude of the craft from a first predetermined altitude down to a second predetermined altitude to compensate for convergence of the glide slope beam, and means for continuously modifying the output signal of said integrator in accordance with the instantaneous craft altitude from the second predetermined altitude to touchdown such that the touchdown descent rate is a prescribed fraction of the instantaneous descent rate prevailing at the second predetermined altitude.

* * * * *

Disclaimer 3,652,835.—*Bernard T. Devlin* and *William F. Poland*, Phoenix, Ariz. AIRCRAFT GLIDE SLOPE COUPLER SYSTEM. Patent dated Mar. 28, 1972. Disclaimer filed Sept. 27, 1974, by the assignee, *Sperry Rand Corporation*.

Hereby enters this disclaimer to claims 1, 8, 10, 13 and 14 of said patent.

[*Official Gazette January 14, 1975.*]